(12) United States Patent
Hwang et al.

(10) Patent No.: US 11,789,956 B2
(45) Date of Patent: Oct. 17, 2023

(54) METHOD AND SYSTEM FOR EXTRACTING MEDIATOR VARIABLE AND MEDIATION INFLUENCE FROM MULTIVARIATE SET

(71) Applicant: Electronics and Telecommunications Research Institute, Daejeon (KR)

(72) Inventors: Yu Min Hwang, Gwangju (KR); Byung Tak Lee, Gyeonggi-do (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 29 days.

(21) Appl. No.: 17/489,265

(22) Filed: Sep. 29, 2021

(65) Prior Publication Data
US 2022/0261401 A1    Aug. 18, 2022

(30) Foreign Application Priority Data
Feb. 15, 2021  (KR) .................. 10-2021-0019934

(51) Int. Cl.
*G06F 16/00*     (2019.01)
*G06F 16/2458*   (2019.01)
*G06F 16/28*     (2019.01)

(52) U.S. Cl.
CPC ........ *G06F 16/2465* (2019.01); *G06F 16/285* (2019.01)

(58) Field of Classification Search
CPC ............................ G06F 16/2465; G06F 16/285
(Continued)

(56) References Cited

U.S. PATENT DOCUMENTS 10,460,008 B2 * 10/2019  Ni ........................ G06F 17/10
                                                  707/707
10,754,857 B2    8/2020  Lee
(Continued)

FOREIGN PATENT DOCUMENTS

KR      10-1741248         5/2017
KR      10-2018-0059898    6/2018
(Continued)

OTHER PUBLICATIONS

Xu, Haoyan, et al., Multivariate Time Series Forecasting Based on Causal Inference with Transfer Entropy and Graph Neural Network, https://arxiv.org/abs/2005.01185, 2020. (Year: 2020).*
(Continued)

*Primary Examiner* — Alexandria Y Bromell
(74) *Attorney, Agent, or Firm* — KILE PARK REED & HOUTTEMAN PLLC

(57) ABSTRACT

Provided is a method of extracting a mediator variable and a mediation influence from a multivariate set. The method includes: receiving a database in which a set of N multiple variables (N is a natural number) including at least one of discrete time series data or continuous time series data is stored; selecting a test variable set including an independent variable, a dependent variable, and a mediator variable from the database in which the multivariate set is stored; determining the mediator variable using transfer entropy and conditional transfer entropy for the selected test variable set; and calculating a mediation influence of the determined mediator variable, wherein the mediation influence is separately calculated as an individual causal influence of the mediator variable and a group causal influence of mediator variables.

17 Claims, 7 Drawing Sheets

(58) Field of Classification Search
USPC .......................................................... 707/737
See application file for complete search history.

(56) References Cited

U.S. PATENT DOCUMENTS

| | | | |
|---|---|---|---|
| 2018/0103302 A1* | 4/2018 | Bell ....................... | G01R 35/00 707/707 |
| 2018/0267523 A1 | 9/2018 | Sigtermans et al. | |
| 2019/0246927 A1* | 8/2019 | Väyrynen ............... | A61B 5/374 707/707 |
| 2020/0210895 A1 | 7/2020 | Han et al. | |

FOREIGN PATENT DOCUMENTS

| KR | 10-2019-0062413 | 6/2019 |
|---|---|---|
| KR | 10-2020-0101735 | 8/2020 |

OTHER PUBLICATIONS

Haoyan Xu et al., "Multivariate Time Series Forecasting Based on Causal Inference with Transfer Entropy and Graph Neural Network" arXiv:2005.01185v1 [cs.LG] May 3, 2020, pp. 1-9.
M. Lucchini, et al., "Transfer Entropy Modeling of Newborn Cardiorespiratory Regulation", Front, Physiol., Aug. 27, 2020.
J. Runge, "Quantifying information transfer and mediation along causal pathways in complex systems", Phys. Rev. E vol. 92, Dec. 28, 2015.

* cited by examiner

|   | A |   | B |   | C |   | D |   |
|---|---|---|---|---|---|---|---|---|
| A | - |   | C | 0.1 | B | 0.3 | B | 0.5 |
|   |   |   | D | 0.2 | D | 0 | C | 0.1 |
|   |   |   | C, D | 0.22 | B, D | 0.33 | B, C | 0.51 |
| B | C | 0.05 | - |   | A | 0.1 | A | 0.6 |
|   | D | 0.01 |   |   | D | 0 | C | 0.2 |
|   | C, D | 0.05 |   |   | A, D | 0.1 | A, C | 0.66 |
| C | B | 0 | A | 0.5 | - |   | A | 0.3 |
|   | D | 0.12 | D | 0 |   |   | B | 0.1 |
|   | B, D | 0.12 | A, D | 0.5 |   |   | A, B | 0.35 |
| D | B | 0.3 | A | 0 | A | 0 | - |   |
|   | C | 0.2 | C | 0 | B | 0 |   |   |
|   | B, C | 0.4 | A, C | 0 | A, B | 0 |   |   |

METHOD AND SYSTEM FOR EXTRACTING MEDIATOR VARIABLE AND MEDIATION INFLUENCE FROM MULTIVARIATE SET

CROSS-REFERENCE TO RELATED APPLICATION

This application claims priority to and the benefit of Korean Patent Application No. 10-2021-0019934, filed on Feb. 15, 2021, the disclosure of which is incorporated herein by reference in its entirety.

BACKGROUND

1. Field of the Invention

The present invention relates to a method and system for extracting a mediator variable and a mediation influence from a multivariate set.

2. Discussion of Related Art

As data is collected through Internet of Things (IoT) sensors, social media, and web pages, big data is formed, and analysis of big data allows various factors for generating socio-economic values to be extracted.

However, some of the collected pieces of data may be missing during the collection process for various reasons or may include unreliable data, and such missing data acts as a factor that may degrade big data analysis performance in statistical terms.

Conventional methods of correcting or predicting missing values include simply removing data with a missing rate less than 10% and using only reliable data, or as for data with a missing rate greater than or equal to 10%, correcting missing values using hot deck, deep learning regression, model-based methods, etc.

However, in order to construct a complete data set or to predict future values with high reliability, the above-described method of correcting or predicting missing values is required to be improved in terms of reliability and accuracy.

RELATED ART DOCUMENTS

Patent Document

Korean Unexamined Patent Publication No. 10-2019-0062413 (2019 Jun. 5)

SUMMARY OF THE INVENTION

The present invention is directed to providing a method and system for extracting a mediator variable and a mediation influence from a multivariate set, that are capable of extracting a mediator variable from a multivariate set when a dependent variable is causally affected by an independent variable indirectly through the mediator variable in multivariate time series data, and determining whether a specific variable is causally affected by a third variable in forming a future value for the multiple variables.

The present invention is also directed to providing a method and system for extracting a mediator variable and a mediation influence from a multivariate set, that are capable of associating information about a mediator variable and a mediation influence with an artificial intelligence (AI) graph neural network (GNN) so that a future value of a specific variable is predicted or a missing value is corrected to construct a complete data set.

The technical objectives of the present invention are not limited to the above, and other objectives may become apparent to those of ordinary skill in the art based on the following description.

According to an aspect of the present invention, there is provided a method of extracting a mediator variable and a mediation influence from a multivariate set, which is performed by a computer, the method including: receiving a database in which a set of N multiple variables (N is a natural number) including at least one of discrete time series data or continuous time series data is stored; selecting a test variable set including an independent variable, a dependent variable, and a mediator variable from the database in which the multivariate set is stored; determining the mediator variable using transfer entropy and conditional transfer entropy for the selected test variable set; and calculating a mediation influence of the determined mediator variable, wherein the mediation influence is separately calculated as an individual causal influence and a group causal influence of the mediator variables.

According to another aspect of the present invention, there is provided a system including a memory in which a program for extracting a mediator variable and a mediation influence from a multivariate set is stored and a processor configured to execute the program stored in the memory, wherein the processor executes the program to: select a test variable set including an independent variable, a dependent variable, and a mediator variable from a database in which a set of N multiple variables (N is a natural number) including at least one of discrete time series data or continuous time series data is stored; determine the mediator variable using transfer entropy and conditional transfer entropy for the selected test variable set; and calculate a mediation influence of the determined mediator variable, wherein the mediation influence is separately calculated as an individual causal influence and a group causal influence of the mediator variables.

According to another aspect of the present invention, there is provided a computer program that executes a method of extracting a mediator variable and a mediation influence from a multivariate set and is stored in a computer readable recording medium.

Other specific details of the present invention are included in the specification and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
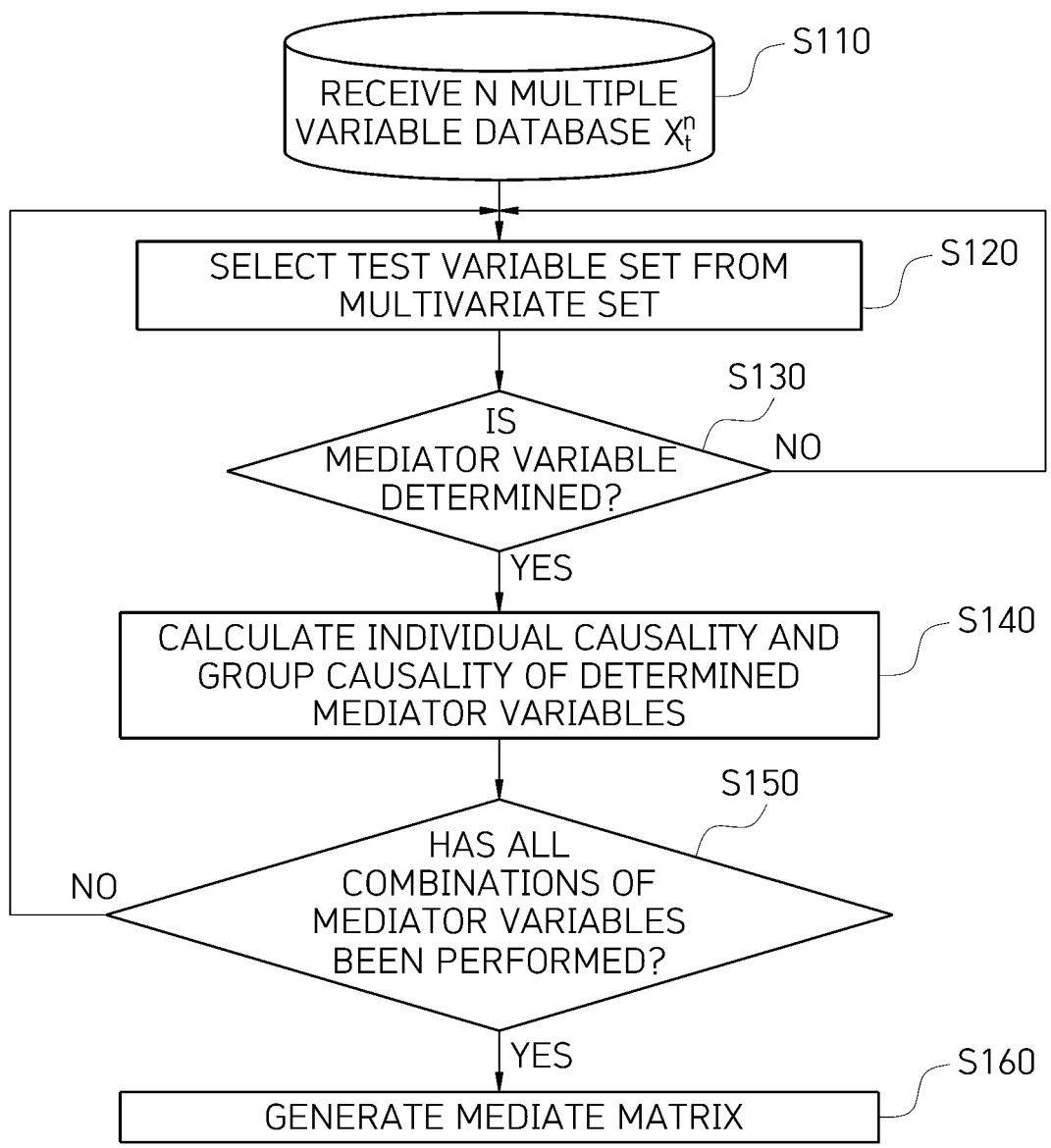
FIG. 1 is a flowchart showing a method of extracting a mediator variable and a mediation influence from a multivariate set according to an embodiment of the present invention.

Hereinafter, the advantages and features of the present invention and ways of achieving them will become readily apparent with reference to descriptions of the following detailed embodiments in conjunction with the accompanying drawings. However, the present invention is not limited to such embodiments and may be embodied in various forms. The embodiments to be described below are provided only to complete the disclosure of the present invention and assist those of ordinary skill in the art in fully understanding the scope of the present invention, and the scope of the present invention is defined only by the appended claims.

Terms used herein are used for aiding in the description and understanding of the embodiments and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof. In connection with assigning reference numerals to elements in the drawings, the same reference numerals are used for designating the same elements throughout the specification, and the term "and/or" includes any one or combinations of the associated listed items. It should be understood that, although the terms "first," "second," etc. may be used herein to describe various elements, these elements are not limited by these terms. These terms are only used for distinguishing one element from another. For example, a first element could be termed a second element without departing from the scope of the present invention.

Unless otherwise defined, all terms (including technical and scientific terms) used herein have the same meaning as commonly understood by one of ordinary skill in the art to which this invention belongs. It should be further understood that terms, such as those defined in commonly used dictionaries, should not be interpreted in an idealized or overly formal sense unless expressly so defined herein.

The present invention relates to a method and a system 100 for extracting a mediator variable and a mediation influence in a multivariate set.

An embodiment of the present invention is characterized by, in order to correct missing values or improve data prediction reliability in a multivariate time series, extracting and determining a mediator variable involved in a causal relationship between independent and dependent variables among multiple variables, In addition, an embodiment of the present invention is characterized by calculating an indirect causal influence of a mediator variable on a dependent variable, and when the mediator variable is plural, calculating a group causal influence of all the determined mediator variables, and finally generating a mediate matrix regarding an individual causal influence and a group causal influence of the mediator variables.

Hereinafter, a method of extracting a mediator variable and a mediation influence in a multivariate set according to an embodiment of the present invention will be described with reference to the accompanying drawings.

FIG. 1 is a flowchart showing a method of extracting a mediator variable and a mediation influence in a multivariate set according to an embodiment of the present invention.

Meanwhile, each operation shown in FIG. 1 may be understood as being performed by the system 100 for extracting the mediator variable and the mediation influence from the multivariate set, but the present invention is not limited thereto.

An embodiment of the present invention includes receiving a database in which a set of N multiple variables (N is a natural number) including at least one of discrete time series data or continuous time series data is stored (S110), selecting a test variable set including an independent variable, a dependent variable, and a mediator variable from the database in which the multivariate set is stored (S120), determining the mediator variable using transfer entropy and conditional transfer entropy for the selected test variable set (S130), and calculating a mediation influence of the determined mediator variable (S140).

First, the system 100 receives the database in which the set of N multiple variables (N is a natural number) including at least one of discrete time series data or continuous time series data is stored (S110).

In the description of the present invention, the multivariate database is described based on discrete time series data, but the present invention is not limited thereto, and it should be understood that the multivariate database may also include continuous time series data.

The database may include a set of N multiple variables $\mathcal{X} = \{X_t^1, X_t^2, \ldots, X_t^n, \ldots, X_t^N\}$, and a variable $X_t^{n(k_n)}$ may be embedded or may have an embedding vector as shown in Equation 1 below.

$$X_t^{n(k_n)} = [x_t^n, x_{t-\tau_n}^n, \ldots, x_{t-(k_n-1)\tau_n}^n] \quad \text{[Equation 1]}$$

In Equation 1 above, $x_{t-(k_n-1)\tau_n}^n$ denotes an element of $X_t^{n(k_n)}$ and represents a value of $x_t^n$ for a time $t=t-(k_n-1)\tau_n$. In addition, $k_n$ denotes an embedding dimension, and $\tau_n$ denotes a time scaling value. Hereinafter, for the sake of convenience in description, $k_n=\tau_n=1$.

Next, the system 100 selects a test variable set including an independent variable, a dependent variable, and a mediator variable from the database in which the multivariate set is stored (S120).

The test variables include an independent variable, a dependent variable, and a mediator variable, and one set of test variables $\mathcal{X} = \{X_t^1, X_t^2, X_t^3\}$ may be selected from the multivariate set $\mathcal{X}$ $X=\{X_t^1, X_t^2, \ldots, X_t^n, \ldots, X_t^N\}$. In this case, the total number of selectable test variable sets in a given multivariate set is $nP_3$ (P is a permutation function). On the other hand, the selection of the test variable set is repeatedly performed until both the mediator variable and the mediation influence (mediation effect) are calculated from the multivariate set (S150).

Next, the system 100 determines the mediator variable using transfer entropy and conditional transfer entropy for the selected test variable set (S130).

In operation S130, a mediator variable for the independent and dependent variables selected as the test variables is determined using transfer entropy and conditional transfer entropy.

Figure 2:
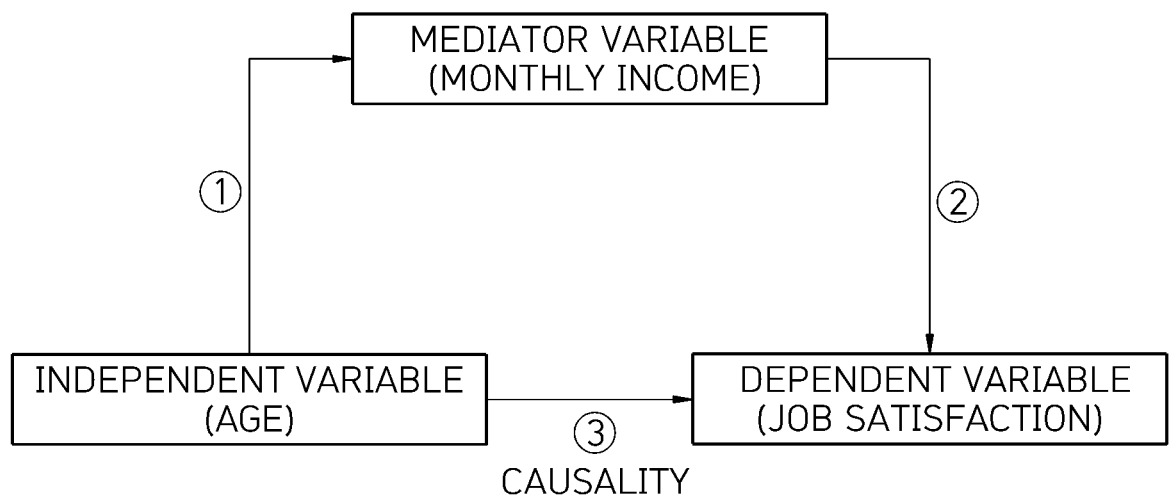
FIG. 2 is a diagram illustrating an example of a causal relationship between independent, dependent, and mediator variables.

FIG. 2 is a diagram illustrating an example of a causal relationship between independent, dependent, and mediator variables.

A mediator variable is a variable that mediates between an independent variable and a dependent variable for the two variables to have an indirect causal relationship and plays an important role in understanding a causal relationship between variables. The present invention is technically characterized not only by determining the mediator variable but also by quantifying the causal influence of the mediator variable on the dependent variable.

Figure 3:
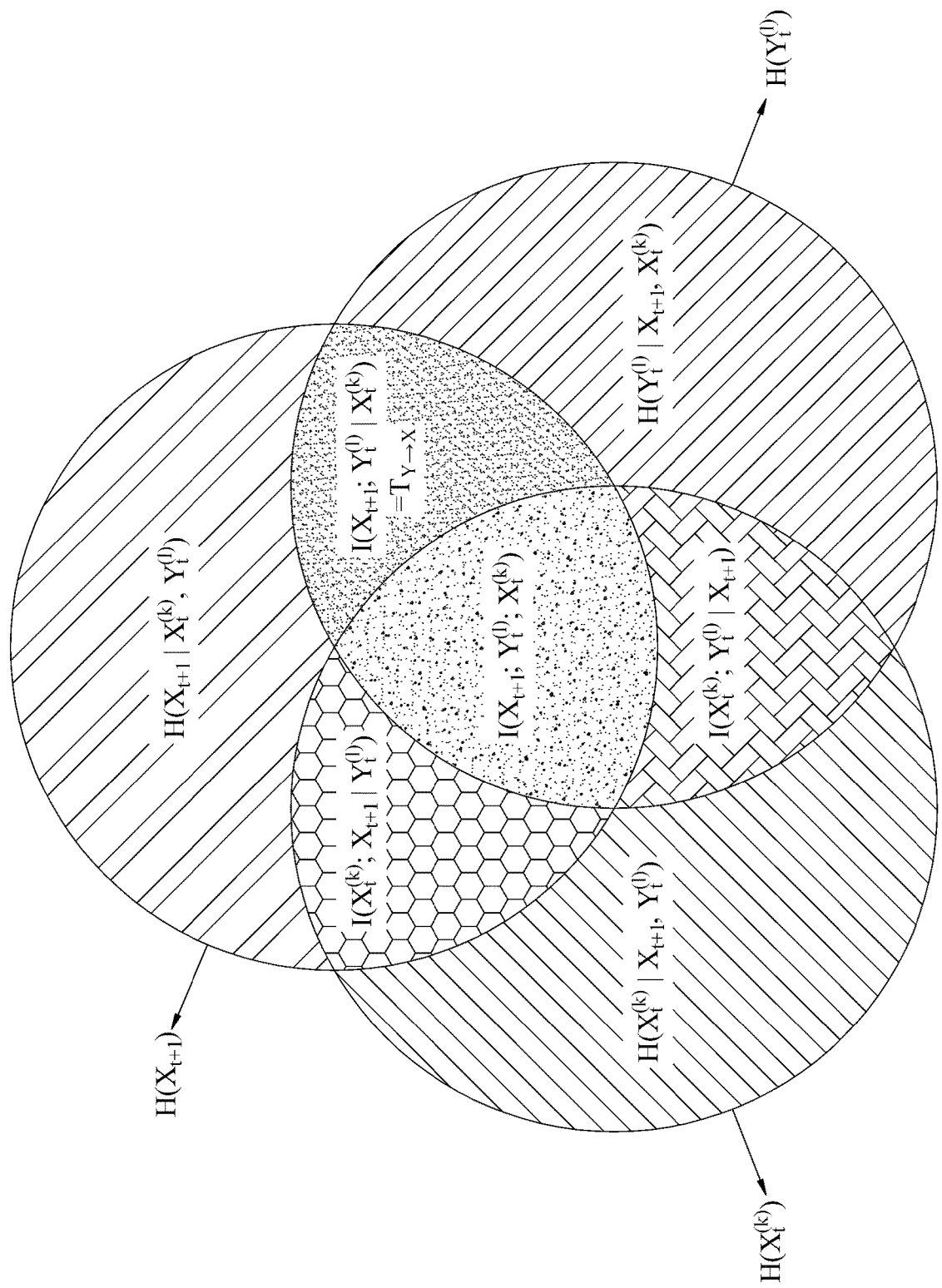
FIG. 3 is a diagram for describing transfer entropy.

FIG. 3 is a diagram for describing transfer entropy.

The transfer entropy represents a causal influence of the independent variable when the dependent variable forms a future value by analyzing an entropy relationship among the multivariate set.

Specifically, in order to calculate the transfer entropy, the entropy of a future variable may be calculated under a condition of the dependent variable being known in advance, the entropy of the future variable may be calculated under a condition of the dependent variable and the independent variable being known in advance, and then the transfer entropy may be calculated based on the difference between the entropies.

In FIG. 3, a causal influence $T_{Y \to X}$ from the independent variable $Y_t$ when the dependent variable $X_t$ forms the future variable $X_{t+h}$ is illustrated. Here, k and l refer to embedding dimensions for the variables $X_t$ and $Y_t$, respectively, and for the sake of convenience in description, it is assumed that a time delay (a lag) h is 1. In this case, the transfer entropy $T_{Y \to X}$ of the set of dependent and independent variables $\{X_t^{(k)}, Y_t^{(l)}\}$ may be calculated as in Equation 2 below according to information theory.

$$T_{Y \to X} = H(X_{t+1}|X_t^{(k)}) - H(X_{t+1}|X_t^{(k)}, Y_t^{(l)}) \quad \text{[Equation 2]}$$

① $H(X_{t+1})$: denotes "uncertainty of information" or "average amount of information" for a variable $X_{t+1}$, and is generally referred to as "entropy".

② $H(X_{t+1}|X_t^{(k)})$: denotes the entropy of $X_{t+1}$ when $X_t^{(k)}$ is known.

③ $H(X_{t+1}|X_t^{(k)}, Y_t^{(l)})$: denotes the entropy of $X_{t+1}$ when $X_t^{(k)}$ and $Y_t^{(l)}$ are known.

④ $H(X_{t+1}|X_t^{(k)}) - H(X_{t+1}|X_t^{(k)}, Y_t^{(l)})$: denotes mutual information between $X_{t+1}$ and $Y_t^{(l)}$ when $X_t^{(k)}$ is known, and in the present invention, the mutual information is expressed as mutual dependence or causal influence. When the mutual information is 0, $Y_t^{(l)}$ has no causal influence on $X_{t+1}$, or a causal influence between $Y_t^{(l)}$ and $X_{t+1}$ is included in a causal influence between $Y_t^{(l)}$ and $X_t^{(k)}$, and thus $Y_t^{(l)}$ may not be used in predicting $X_{t+1}$ when $X_t^{(k)}$ is known. "(transfer entropy; TE) [Terry Bossomaier, Lionel Barnett, Michael Harré, and Joseph T Lizier. Transfer entropy. In An introduction to transfer entropy, pages 65-95. Springer, 2016.]"

Figure 4:
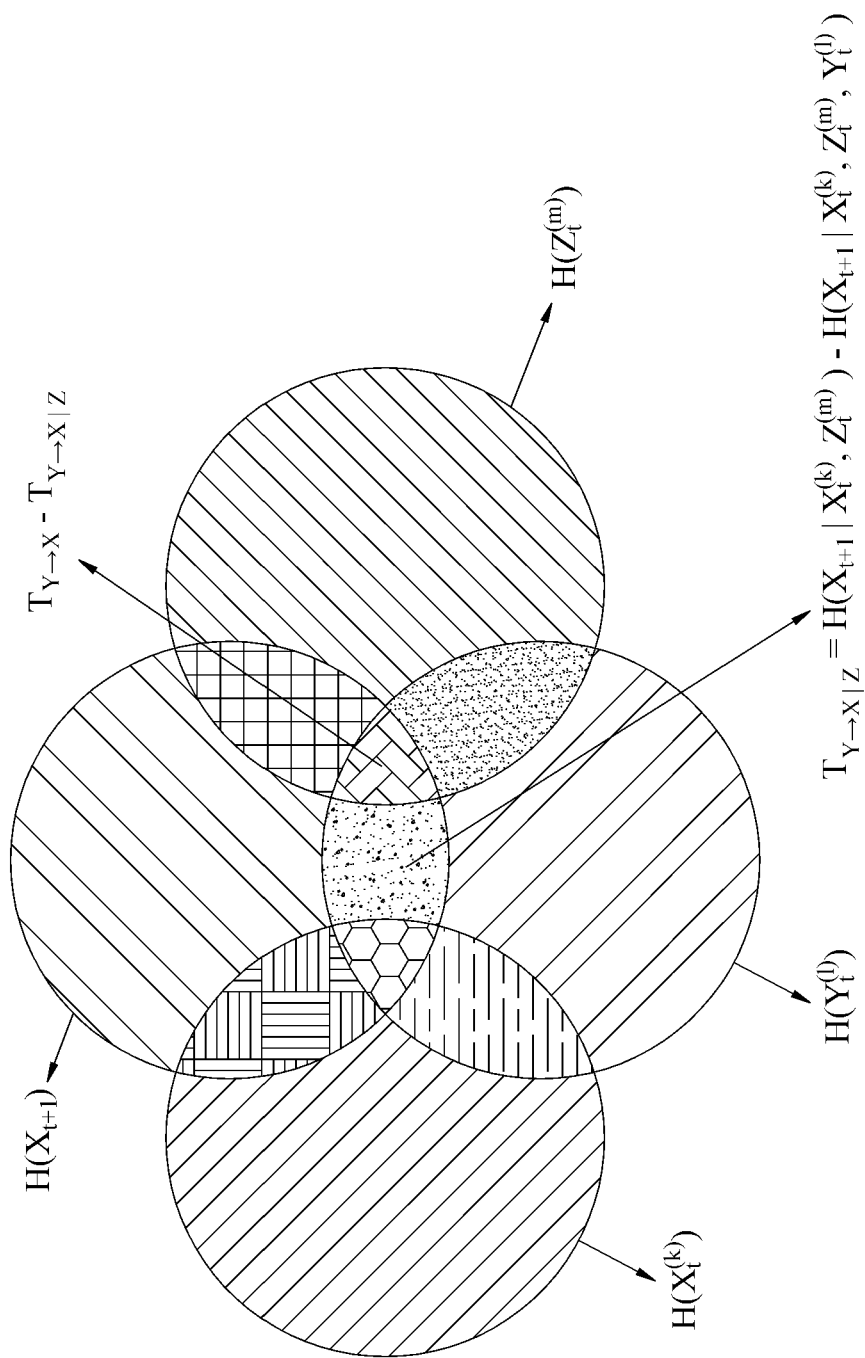
FIG. 4 is a diagram for describing conditional transfer entropy.

FIG. 4 is a diagram for describing conditional transfer entropy.

The conditional transfer entropy refers to the transfer entropy excluding a causality of a third variable except for an independent variable and a dependent variable on the dependent variable. The conditional transfer entropy may be calculated based on a difference between the entropy of a future variable of the dependent variable under a condition of the dependent variable and the third variable being known in advance, and the entropy of the future variable under a condition of the independent, dependent and third variables known in advance.

As an example, when assuming a set of dependent and independent variables $\{X_t^{(k)}, Y_t^{(l)}\}$, a causality of a third variable $Z_t^{(m)}$ on the dependent variable $X_t^{(k)}$ is excluded and a causality of the independent variable on the dependent variable may be calculated, and in this case, the conditional transfer entropy is expressed as $T_{Y \to X|Z}$. In this case, in Equation 3, m denotes an embedding dimension for the variable $Z_t^{(m)}$, and for the sake of convenience in description, it is assumed that the time delay (a lag) h is 1.

$$T_{Y \to X|Z} = H(X_{t+1}|X_t^{(k)}, Z_t^{(m)}) - H(X_{t+1}|X_t^{(k)}, Z_t^{(m)}, Y_t^{(l)})) \quad \text{[Equation 3]}$$

Figure 5:
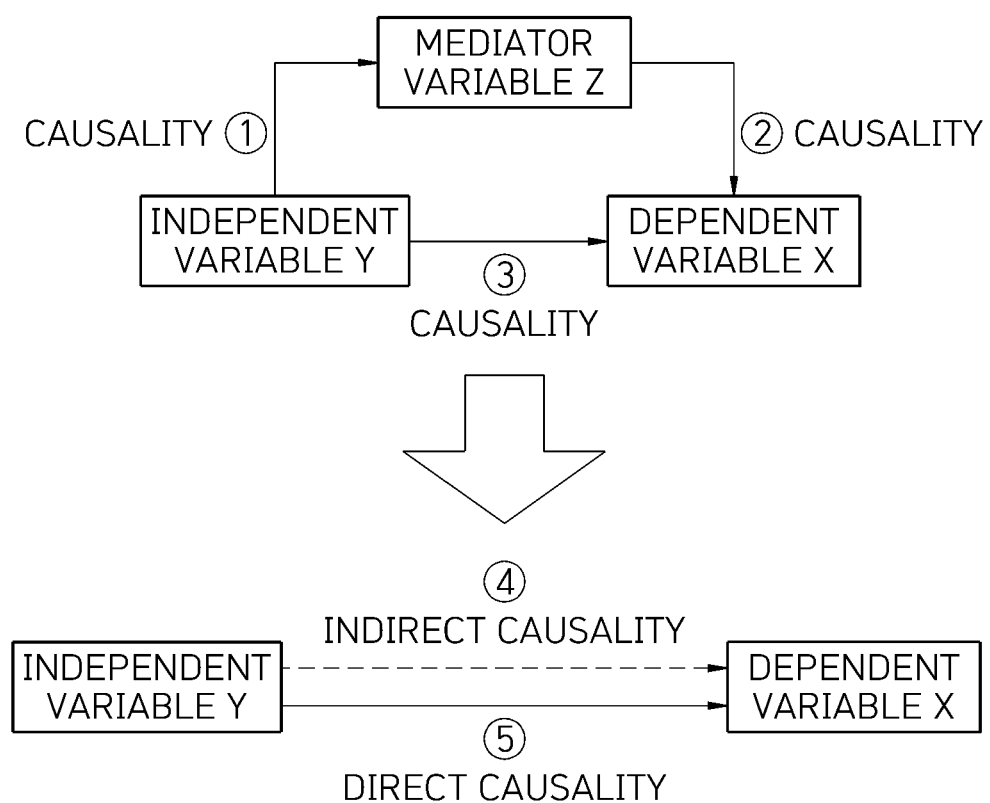
FIG. 5 is a diagram for describing indirect and direct causal relationships between independent, dependent, and mediator variables.

FIG. 5 is a diagram for describing indirect and direct causal relationships between independent, dependent, and mediator variables.

In FIG. 5, the causality of the independent variable Y on the dependent variable X is separately expressed as an indirect causality and a direct causality. In this case, the indirect causality ④ corresponds to a causality flow of Y→Z→X by a mediator variable Z. In the present invention, whether the mediator variable Z exerts an indirect causality ④ on the dependent variable X may be determined based on Equation 4 below.

$$T_{Y \to X} - T_{Y \to X|Z} > \delta \quad \text{[Equation 4]}$$

That is, when the difference between the transfer entropy and the conditional transfer entropy is greater than or equal to a preset threshold value, the third variable may be determined as a mediator variable for the independent variable and the dependent variable.

Here, $T_{Y \to X}$ denotes transfer entropy, $T_{Y \to X|Z}$ denotes conditional transfer entropy, and $\delta > 0$ denotes a threshold value for determining whether a value of $T_{Y \to X} - T_{Y \to X|Y}$ exists. When the value of $T_{Y \to X} - T_{Y \to X|Y}$ is greater than or equal to the threshold value, a variable Z is determined as a mediator variable for the independent variable Y and the dependent variable X.

Next, the system 100 calculates a mediation influence of the determined mediator variable (S140). In this case, the mediation influence may be separately calculated as an individual causal influence and a group causal influence of the mediation variables.

The individual causal influence of a mediator variable refers to the degree to which a single variable $M^1$, as a mediator variable, exerts a causal influence. The individual causal influence may be calculated as in Equation 5 below, based on the difference between the transfer entropy and the conditional transfer entropy corresponding to the determined mediator variable in the same way as in Equation 4 above.

$$T_{Y \to X} - T_{Y \to X|M^1} = H(X_{t+1}|X_t^{(k)}) - H(X_{t+1}|X_t^{(k)}, Y_t^{(l)}) - \quad \text{[Equation 5]}$$
$$\{H(X_{t+1}|X_t^{(k)}, M^1) - H(X_{t+1}|X_t^{(k)}, M^1, Y_t^{(l)})\}$$

Figure 6:
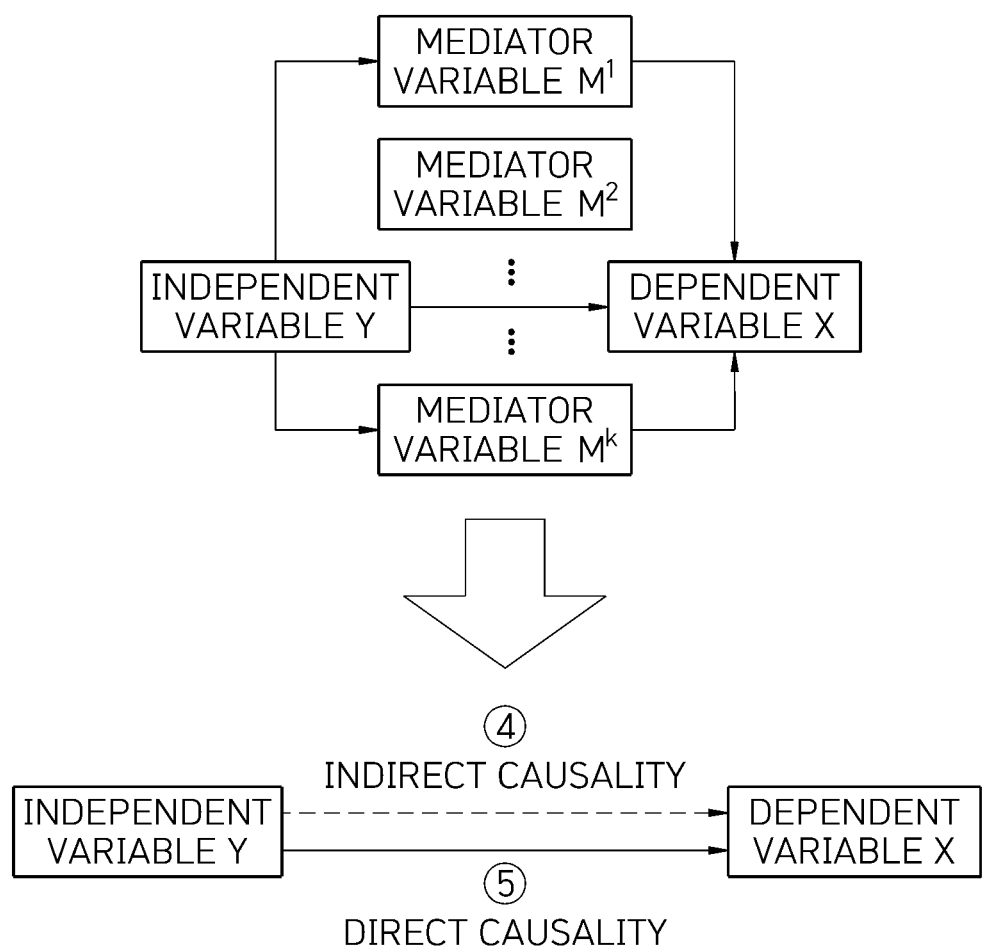
FIG. 6 is a diagram for describing a group causal influence of mediator variables.

FIG. 6 is a diagram for describing a group causal influence of mediator variables.

The group causal influence of mediator variables is an index indicating the degree to which a set of two or more variables $M = \{M^1, M^2, \ldots, M^K\}$, as a mediator variable, exerts a group causal influence, and referring to FIG. 6, multiple mediator variables may be expressed as one indirect causal influence on the dependent variable X.

The group causal influence of mediator variables may be calculated as in Equation 6 below, based on the difference between the transfer entropy and the conditional transfer entropy corresponding to the mediator variable set including a plurality of mediator variables.

$$T_{Y \to X} - T_{Y \to X | M^1, M^2, \ldots, M^K} = \quad \text{[Equation 6]}$$
$$H(X_{t+1} | X_t^{(k)}) - H(X_{t+1} | X_t^{(k)}, Y_t^{(l)}) -$$
$$\{H(X_{t+1} | X_t^{(k)}, M^1, M^2, \ldots, M^K) -$$
$$H(X_{t+1} | X_t^{(k)}, M^1, M^2, \ldots, M^K, Y_t^{(l)})\}$$

After the mediate variable and the mediation influence corresponding to the mediator variable are calculated as described above, a mediate matrix may be generated for the independent and dependent variables and the mediator variable corresponding to the independent and dependent variables (S160).

Figures 7, 8:
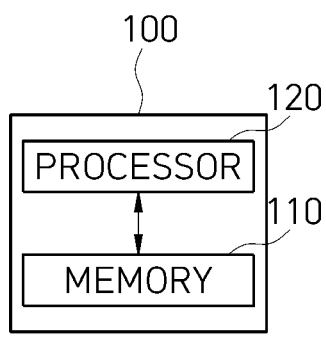
FIG. 7 is a diagram illustrating an example of a mediate matrix for four types of multiple variables.
FIG. 8 is a block diagram illustrating a system for extracting a mediator variable and a mediation influence from a multivariate set according to an embodiment of the present invention.

FIG. 7 is a diagram illustrating an example of a mediate matrix for four types of multiple variables.

For example, an example of a mediate matrix generated for a multivariate data set including variables A, B, C, and D is shown in FIG. 7. For an independent variable A and a dependent variable B, mediator variables C and D may be provided. In this case, in FIG. 7, the mediator variable C exerts a causal influence of 0.1, which exceeds a preset threshold value of 0.01, and thus is defined as a mediator variable. In addition, the group causal influence simultaneously exerted by C and D corresponds to 0.22.

The determined mediator variables and the individual and group causal influences resulting from the present invention may detect a variable that has an indirect causal relationship when the multiple variables form a future value, and may include a value that quantifies the causal influence, and thus may provide a distinct point compared to the existing adjacency matrix that records only simple connection information, as shown in Table 1 below.

TABLE 1

|  | Direction of Causality | Expression of Causality | Extraction of Direct Causality | Optimization of Hyper-parameter |
|---|---|---|---|---|
| Adjacency matrix | Bi-direction | on/off(0 or 1) | X | X |
| Mediate matrix(Present invention) | Uni-direction or bi-direcion, or both | Real number greater than or equal to 0 | ◯ | ◯ |

Meanwhile, in the above description, operations S110 to S160 may be further divided into a larger number of operations or combined into a smaller number of operations according to examples of implementation of the present invention. In addition, some of the operations may be omitted or may be executed in the reverse order as needed. Parts omitted in the following description, which has been described above with reference to FIGS. 1 to 7, may be applied to the system 100 for extracting a mediator variable and a mediation influence in a multivariate set described with reference to FIG. 8.

FIG. 8 is a block diagram illustrating the system 100 for extracting a mediator variable and a mediation influence in a multivariate set according to an embodiment of the present invention.

The system 100 for extracting a mediator variable and a mediation influence in a multivariate set according to the embodiment of the present invention includes a memory 110 and a processor 120.

The memory 110 stores a database including a multivariate set and stores a program for extracting a mediator variable and a mediation influence from the multivariate set, and the processor 120 executes the program stored in the memory 110.

The processor 120 executes the program, to select a test variable set including an independent variable, a dependent variable, and a mediator variable from the database in which a set of N multiple variables (N is a natural number) including at least one of discrete time series data or continuous time series data is stored, determine the mediator variable using transfer entropy and conditional transfer entropy for the selected test variable set, and calculate a mediation effect of the determined mediator variable.

The above described method of extracting a mediator variable and a mediation influence in a multivariate set according to the embodiment of the present invention may be implemented as a program (or an application) to be executed in combination with a computer, which is hardware, and stored in a medium.

The above described program may include code coded in a computer language C, C++, Java, a machine language, etc., that can be read by the computer through a device interface of the computer in order for the computer to read the program and execute the method implemented as the program. The code may include functional code that is related to a function that defines functions needed to execute the methods and may include execution procedure-related control code needed to cause the processor of the computer to execute the functions according to a predetermined procedure. In addition, the code may further include memory reference-related code as to whether additional information or media needed to cause the processor of the computer to execute the functions should be referenced at a location (an address) of an internal or external memory of the computer. In addition, when the processor of the computer needs to communicate with any other computers or servers, etc. at a remote site, to perform the above-described functions, the code may further include communication-related code such as how to communicate with any other computers or servers at a remote site and what information or media should be transmitted or received during communication.

The storage medium does not refer to a medium that stores data for a short period of time, such as a register, cache, memory, etc., but refers to a medium that stores data semi-permanently and can be read by a device. Specifically, examples of the storage medium include may include a read-only memory (ROM), a random-access memory (RAM), a compact disc (CD)-ROM, a magnetic tape, a floppy disk, an optical data storage device, etc. but are not limited thereto. That is, the program may be stored in various recording media on various servers which the computer can access or in various recording media on the computer of the user. In addition, the medium may be distributed over computer systems connected through a network so that computer-readable code may be stored in a distributed manner.

As is apparent from the above, a mediate matrix derived according to the present invention described above can detect a variable that has an indirect causal relationship when multiple variables form a future value thereof and include a value obtained by quantifying the causal influence, thereby providing a benefit over the conventional adjacency matrix that records only simple connection information.

In addition, the mediate matrix derived by an embodiment of the present invention can represent an indirect causal influence regarding data expressed as objects and relationships between the objects, such as an image, a social network, statistical data, and a molecular structure, as well as multivariate time series data.

In addition, the mediate matrix derived according to the present invention can be associated with input data of an AI GNN to thereby be applied and used in various fields, such as predicting a future value of a specific variable or correcting a missing value to construct a complete data set.

The effects of the present invention are not limited to those described above, and other effects not mentioned above will be clearly understood by those skilled in the art from the above detailed description.

The above description of the invention is for illustrative purposes, and a person having ordinary skills in the art should appreciate that other specific modifications can be easily made without departing from the technical spirit or essential features of the invention. Therefore, the above-described embodiments should be regarded as illustrative rather than limitative in all aspects. For example, components which have been described as being a single unit can be embodied in a distributed form, whereas components which have been described as being distributed can be embodied in a combined form.

The scope of the present invention is not defined by the detailed description as set forth above but by the accompanying claims of the invention. It should also be understood that all changes or modifications derived from the definitions and scope of the claims and their equivalents fall within the scope of the invention.

What is claimed is:

1. A method of extracting a mediator variable and a mediation influence from a multivariate set, which is performed by a computer, the method comprising:
    receiving a database in which a set of N multiple variables (N is a natural number) including at least one of discrete time series data or continuous time series data is stored;
    selecting a test variable set including an independent variable, a dependent variable, and a mediator variable from the database in which the multivariate set is stored;
    determining the mediator variable using transfer entropy and conditional transfer entropy for the selected test variable set;
    calculating a mediation influence of the determined mediator variable,
    wherein the mediation influence is separately calculated as an individual casual influence of the mediator variable and a group casual influence of mediator variables,
    wherein the determining of the mediator variable using the transfer entropy and the conditional transfer entropy for the selected test variable set includes:
        analyzing an entropy relationship among the multivariate set and calculating transfer entropy that represents a causal influence of the independent variable when the dependent variable forms a future value; and
        calculating conditional transfer entropy, which is transfer entropy excluding a causality on the dependent variable by a third variable other than the independent variable and the dependent variable.

2. The method of claim 1, wherein the calculating of the transfer entropy includes calculating the transfer entropy based on a difference between entropy of a future variable under a condition of the dependent variable being known in advance and entropy of the future variable under a condition of the dependent variable and the independent variable being known in advance.

3. The method of claim 1, wherein the calculating of the conditional transfer entropy includes calculating the conditional transfer entropy based on a difference between entropy of a future variable of the dependent variable under a condition of the dependent variable and the third variable being known in advance, and entropy of the future variable under a condition of the independent variable, the dependent variable, and the third variable being known in advance.

4. The method of claim 1, wherein the determining of the mediator variable using the transfer entropy and the conditional transfer entropy for the selected test variable set includes, when a difference between the transfer entropy and the conditional transfer entropy is greater than or equal to a preset threshold value, determining the third variable as a mediator variable for the independent variable and the dependent variable.

5. The method of claim 4, wherein the calculating of the mediation influence of the determined mediator variable includes calculating a difference between the transfer entropy and the conditional transfer entropy corresponding to the determined mediator variable as an individual causal influence.

6. The method of claim 4, wherein the calculating of the mediation influence of the determined mediator variable includes calculating a difference between the transfer entropy and the conditional transfer entropy corresponding to a mediator variable set including a plurality of mediator variables as a group causal influence.

7. The method of claim 1, further comprising generating a mediate matrix for the independent variable, the dependent variable, and the mediator variable corresponding to the independent variable and the dependent variable.

8. The method of claim 1, wherein the determining of the mediator variable using the transfer entropy and the conditional transfer entropy for the selected test variable set is repeatedly performed on test variable sets selected according to all combinations of variables in the multivariate set.

9. The method of claim 1, wherein the determining of the mediator variable using the transfer entropy and the conditional transfer entropy for the selected test variable set includes:
    calculating the conditional transfer entropy, which is transfer entropy excluding a causality on the dependent variable by a third variable other than the independent variable and the dependent variable.

10. A system including a memory in which a program for extracting a mediator variable and a mediation influence from a multivariate set is stored and a processor configured to execute the program stored in the memory,
    wherein the processor executes the program to:
        select a test variable set including an independent variable, a dependent variable, and a mediator variable from a database in which a set of N multiple variables (N is a natural number) including at least one of discrete time series data or continuous time series data is stored;
        determine the mediator variable using transfer entropy and conditional transfer entropy for the selected test variable set; and
        calculate a mediation influence of the determined mediator variable,
    wherein the mediation influence is separately calculated as an individual causal influence of the mediator variable and a group causal influence of mediator variables, and wherein the determining of the mediator variable using the transfer entropy and the conditional transfer entropy for the selected test variable set includes:
- analyzing an entropy relationship among the multivariate set and calculating transfer entropy that represents a causal influence of the independent variable when the dependent variable forms a future value; and
- calculating conditional transfer entropy, which is transfer entropy excluding a causality on the dependent variable by a third variable other than the independent variable and the dependent variable.

11. The system of claim 10, wherein the processor is configured to:
- analyze an entropy relationship among the multivariate set;
- calculate transfer entropy that represents a causal influence of the independent variable when the dependent variable forms a future value; and
- calculate conditional transfer entropy, which is transfer entropy excluding a causality on the dependent variable by a third variable other than the independent variable and the dependent variable.

12. The system of claim 11, wherein the processor is configured to calculate the transfer entropy based on a difference between entropy of a future variable under a condition of the dependent variable being known in advance and entropy of the future variable under a condition of the dependent variable and the independent variable being known in advance.

13. The system of claim 11, wherein the processor is configured to calculate the conditional transfer entropy based on a difference between entropy of a future variable of the dependent variable under a condition of the dependent variable and the third variable being known in advance, and entropy of the future variable under a condition of the independent variable, the dependent variable, and the third variable being known in advance.

14. The system of claim 11, wherein the processor is configured to, when a difference between the transfer entropy and the conditional transfer entropy is greater than or equal to a preset threshold value, determine the third variable as a mediator variable for the independent variable and the dependent variable.

15. The system of claim 14, wherein the processor is configured to:
- calculate a difference between the transfer entropy and the conditional transfer entropy corresponding to the determined mediator variable as an individual causal influence; and
- calculate a difference between the transfer entropy and the conditional transfer entropy corresponding to a mediator variable set including a plurality of mediator variables as a group causal influence.

16. The system of claim 15, wherein the processor is configured to generate a mediate matrix for the independent variable, the dependent variable, and the mediator variable corresponding to the independent variable and the dependent variable, and provide the generated mediate matrix.

17. The system of claim 10, wherein the determining of the mediator variable using the transfer entropy and the conditional transfer entropy for the selected test variable set includes:
- calculating the conditional transfer entropy, which is transfer entropy excluding a causality on the dependent variable by a third variable other than the independent variable and the dependent variable.

* * * * *